United States Patent
Culurciello et al.

(10) Patent No.: US 12,045,718 B2
(45) Date of Patent: Jul. 23, 2024

(54) EVOLUTIONARY IMITATION LEARNING

(71) Applicant: Micron Technology, Inc., Boise, ID (US)

(72) Inventors: Eugenio Culurciello, West Lafayette, IN (US); Andre Xian Ming Chang, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 826 days.

(21) Appl. No.: 17/124,389

(22) Filed: Dec. 16, 2020

(65) Prior Publication Data

US 2022/0188632 A1   Jun. 16, 2022

(51) Int. Cl.
  *G06N 3/08* (2023.01)
  *G06F 18/21* (2023.01)
  *G06F 18/211* (2023.01)

(52) U.S. Cl.
  CPC ............ *G06N 3/08* (2013.01); *G06F 18/211* (2023.01); *G06F 18/217* (2023.01)

(58) Field of Classification Search
  CPC ........................................................ G06N 3/08
  See application file for complete search history.

(56) References Cited

U.S. PATENT DOCUMENTS

| | | | |
|---|---|---|---|
| 10,887,396 B2 * | 1/2021 | Manweiler | H04L 67/12 |
| 11,544,532 B2 * | 1/2023 | Puscas | G06N 20/00 |
| 2019/0171936 A1 | 6/2019 | Karras et al. | |
| 2019/0317803 A1 | 10/2019 | Maheshwari et al. | |
| 2020/0364625 A1 | 11/2020 | Baker et al. | |
| 2021/0181728 A1 | 6/2021 | Yamaguchi et al. | |

OTHER PUBLICATIONS

Ortega et al. "Imitating human playing styles in Super Mario Bros", Entertainment Computing, 2013, pp. 93-104.*
Togelius et al. "Towards automatic personalised content creation for racing games", IEEE Symposium CIG, 2007, pp. 252-259.*
Floreano, Dario, et al. "Evolution of Adaptive Behaviour in Robots by Means of Darwinian Selection." PloS Biology, vol. 8, Issue 1, Jan. 2010.
International Search Report and Written Opinion, PCT/US2021/062593, mailed on Apr. 4, 2022.
Kim, Min-Kyu, et al., "Emerging Materials for Neuromorphic Devices and Systems." ScienceDirect, Dec. 18, 2020.
Evolutionary Algorithm, Wikipedia, printed on Nov. 17, 2020.

(Continued)

*Primary Examiner* — Li Wu Chang
(74) *Attorney, Agent, or Firm* — Greenberg Traurig (57) ABSTRACT

Systems, devices, and methods of evolutionary imitation learning are described. For example, a computing system trains an artificial neural network (ANN) using a supervised machine learning technique according to first example data representative of a behavior to be imitated by the ANN in performing a task. The ANN is used to generate first sample data representative of a behavior of the ANN in performing the task. The computing system modifies the first sample data using a technique of evolutionary algorithm to generate second sample data according to a criterion configured to select mutations of the behavior of the ANN. The computing system further trains the ANN according to the second sample data using the supervised machine learning technique.

20 Claims, 5 Drawing Sheets

(56) References Cited

OTHER PUBLICATIONS

Lillicrap, Timothy P., et al. "Continuous control with deep reinforcement learning." arXiv preprint arXiv:1509.02971 (2015).

Robert Dadashi, "Imitation Learning in the Low-Data Regime", Google AI Blog, https://ai.googleblog.com/2020/09/imitation-learning-in-low-data-regime.html, Sep. 15, 2020.

Memory Device Performing Multiplication using Logical States of Memory Cells, U.S. Appl No. 18/494,652, filed Oct. 25, 2023, Hernan Castro.

Memory Device Performing Signed Multiplication using Logical States of Memory Cells, U.S. Appl. No. 18/423,161, filed Jan. 25, 2024, Hernan Castro.

Memory Device Performing Signed Multiplication using Sets of Two Memory Cells, U.S. Appl. No. 18/423,163, filed Jan. 25, 2024, Hernan Castro.

Memory Device Performing Signed Multiplication using Sets of Four Memory Cells, U.S. Appl. No. 18/423,168, filed Jan. 25, 2024, Hernan Castro.

Memory Device for Summation of Outputs of Signed Multiplications, U.S. Appl. No. 18/423,174, filed Jan. 25, 2024, Hernan Castro.

Memory Device for Signed Multi-Bit to Multi-Bit Multiplications, U.S. Appl. No. 18/423,178, filed Jan. 25, 2024, Hernan Castro.

Memory Device for Multiplication using Memory Cells with Different Thresholds based on Bit Significance, U.S. Appl. No. 18/423,181, filed Jan. 25, 2024, Hernan Castro.

Memory Device for Multiplication using Memory Cells Having Different Bias Levels based on Bit Significance, U.S. Appl. No. 18/423,186, filed Jan. 25, 2024, Hernan Castro.

\* cited by examiner

EVOLUTIONARY IMITATION LEARNING

TECHNICAL FIELD

At least some embodiments disclosed herein relate to machine learning in general and more particularly, but not limited to, imitation learning.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some embodiments disclosed herein provide a technique of evolutionary imitation learning. The technique includes the use of evolutionary algorithm to search for better examples to train an artificial neural network (ANN).

For example, in a robotics application, an artificial neural network (ANN) can be used to establish a model to control a robot to perform a task. The model can be trained using supervised machine learning based on one or more examples performed by a human operator. Thus, the model is trained to imitate the way to generate solutions by the human operator in performing the task. However, since examples offered by a human operator are typically not optimal, the model trained through imitation learning is not optimal in accomplishing the task.

Usually there aren't a large amount of optimal examples of a robot accomplishing a task. A professional robot programmer can make the robot accomplish tasks in a way that is much more efficiently than a novice programmer. However, even with professional programming, the method used may not be the most optimal. The programming may fail in some cases and/or environments that the programmer fails to account for. In addition, it is costly to acquire the expertise and work of a professional programmer. Imitation learning can eliminate the need for explicit programming by using supervised learning to train an ANN model to mimic the behavior in the collection of examples. However, when the examples are non-optimal or there are unseen cases, the model trained by the examples won't be able to account for it.

At least some aspects of the present disclosure address the above and other deficiencies and/or challenges by providing a technique of evolutionary imitation learning that can be used to continuously improve an artificial neural network (ANN) model. Starting from a collection of examples that are not optimal, an evolutionary algorithm is used to search for better examples by evolving samples derived from the ANN model previously trained using the existing examples. Better examples identified in the evolutionary search are used to further train the ANN model and thus fine-tune the model for improved overall performance and/or capability.

For example, a model used by a robot to perform a task can be built using an artificial neural network (ANN). Such an ANN can include a plurality of artificial neurons having parameters adjustable through machine learning to model a desirable behavior, such as controlling a robot to perform a task.

For example, each neuron in the ANN is configured to receive a set of inputs. Some of the inputs to a neuron can be the outputs of certain neurons in the ANN; and some of the inputs to a neuron can be the inputs provided to the ANN. The input/output relations among the neurons in the ANN represent the neuron connectivity in the ANN.

For example, each neuron in the ANN can have a bias, an activation function, and a set of synaptic weights for its inputs respectively. The activation function can be in the form of a step function, a linear function, a log-sigmoid function, etc. Different neurons in the ANN can have different activation functions.

For example, each neuron in the ANN can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the ANN, as well as the bias, activation function, and synaptic weights of each neuron. Based on a given ANN model, a computing device can be configured to compute the output(s) of the ANN from a given set of inputs to the ANN.

For example, the inputs to the ANN model can be sensors inputs of a robot obtained during the performance of a task; and the outputs from the ANN model can be control signals to move the robot in performing the task.

The ANN model can be trained using a supervised machine learning technique to implement imitation learning. For example, a human operator may control the robot to perform the task. Data collected during the performance of the task controlled by the human operator can be used as an example to train the ANN model using a supervised machine learning technique. Supervised machine learning adjusts the parameters in the ANN model to minimize or reduce the difference between the data in the example and the corresponding data generated by the ANN model to perform the task. Thus, the ANN model is trained to imitate the control behavior of the human operator in the example.

Subsequently, evolution can be introduced to search for new examples for improved performance and capability. For example, the ANN model trained using the initial examples can be used to generate samples of performing the tasks. The samples can be modified to generate mutated samples. The performance levels of the mutated samples can be evaluated to identify superior examples that can be used to further train the ANN model using the supervised machine learning technique. Thus, the combination of evolution and imitation provides a framework to continuously improve the ANN model by fine-tuning it with superior examples discovered and selected through evolution.

For example, by observing the robot controlled by the trained ANN model in performing a task, data samples of the robot performing the tasks as controlled by the trained ANN model can be generated. Optionally, the samples can include embedded information tracking changes in environment and task goal, in addition to movements of the robot. Initial samples are collected from observation of a non-optimal solution of the task generated by the trained ANN model. Evolution is used to mutate the initial samples by introducing modifications to values in the initial samples. A large amount of variations in mutation can result in a better diversity to explore different solutions. The performance levels of the solutions are evaluated. Once a better solution is found, the variation moves towards the better solution to further improve samples in general. The mutated samples can be evaluated and ranked using a reward function that simulates whether the robot achieved the goal in a better way, such as faster, less moves and/or more precise. The best mutated examples are saved for the next sequence of mutations and evaluations. Evolution can repeat in iterations to discover a collection of improved samples as output for supervised machine learning. In general, evolutionary search can find better solution faster than random search and reinforcement learning, because it keeps track of the general successful distribution.

The improved samples can be used as examples to fine-tune the existing ANN model that was previously trained on a set of less optimal examples. Such imitation learning can train the ANN model faster than reinforcement learning, because it uses knowledge embed in the examples to learn a task instead of starting from random trial-and-error. Imitation learning in general is more sample efficient, but it is limited to what is in the examples and can't explore for new solutions by itself. The combination of evolution with imitation learning provides a method to explore beyond given examples.

Thus, the evolutionary imitation learning technique provides an iterative framework to continuously improve and explore examples and solutions to fine-tune an ANN model to perform a task.

After each iteration of fine-tuning the ANN model using improved examples discovered through evolution, a key identification can be generated from the difference introduced by the new examples. The key identification can be embedded to the data structure of the improved ANN model, allowing it to be distinguished from prior models that do not have the improvement made via the new examples.

Figure 1:
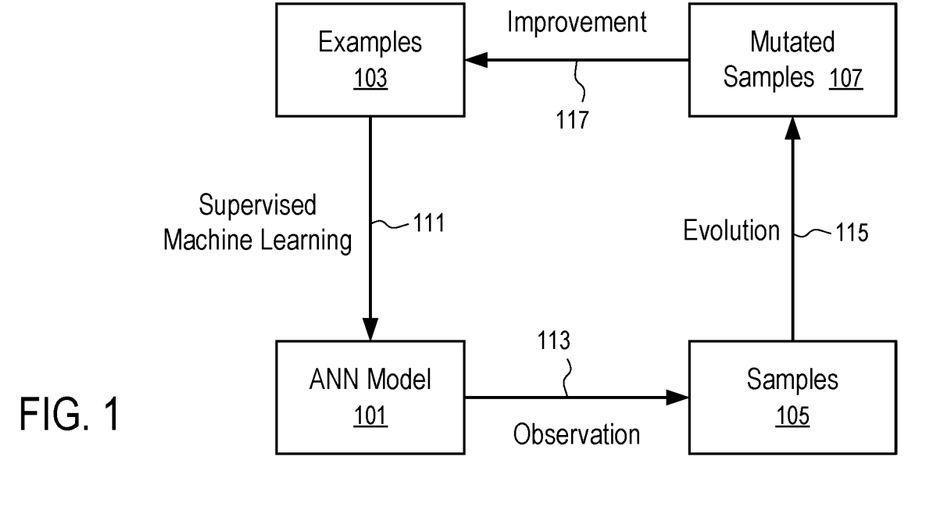
FIG. 1 shows a technique of evolutionary imitation learning according to one embodiment.

FIG. 1 shows a technique of evolutionary imitation learning according to one embodiment.

In FIG. 1, an artificial neural network (ANN) model 101 is trained using supervised machine learning 111 to mimic the behavior captured in one or more examples 103.

For example, the ANN model 101 can be used to control the movement of a robot in performing a task. An example 103 used in the supervised machine learning 111 can include sensor inputs representative of what the robot can observe during the performance of the task and control outputs representative of control signals applied to the robot to perform the task. The supervised machine learning 111 trains the ANN model 101 to reduce or minimize the difference between the control signals generated by the ANN model based on the inputs as seen by the robot and the control signals applied in the example 103. Thus, the supervised machine learning 111 applied via the examples 103 implements imitation learning according to the examples 103.

For example, an initial set of examples 103 used in the supervised machine learning 111 can be generated via a human operator applying the control signals to move the robot to perform the task.

Typically, the examples 103 generated by a human operator show a solution of control signals with a reasonable performance level. However, such examples 103 generated by human operations are typically not optimal; and optimal examples can be difficult to achieve or generate. For example, a human operator may need extensive training to control the robot to perform the task with improved performance level.

In FIG. 1, an evolutionary technique is applied to explore, generate, and identify improved examples that have better performance to further train the ANN model 101, without further efforts from the human operator.

After the ANN model 101 is trained to perform the task according to the examples 103, the behavior of the ANN model 101 can be observed to generate samples 105.

For example, during the observation 113 of the behavior of the ANN model 101, the ANN model 101 is used to generate control signals for the robot performing the task. A sample 105 of performing the task by the robot can include the sensor inputs obtained or generated by the robot and the control signals applied by the ANN model 101 according to the sensor inputs. Thus, a sample 105 can be similar to an example generated via a human operator but is generated by the ANN model 101 of the robot.

Since the ANN model 101 is trained by supervised machine learning 111 using the examples 103, the samples 105 have a performance level similar to the examples 103.

In FIG. 1, modifications can be introduced into the samples 105 to explore and/or discover new solutions to generate mutated samples 107.

For example, during the evolution 115 of the samples 105, incremental changes are applied to the samples 105 to generate mutated samples 107. The performance changes caused by the incremental changes can be evaluated to identify further changes that are likely to further improve the performance level of mutated samples 107. The iterative operations of evolution 115 allows the samples to mutated in directions of improved performance levels.

Mutated samples 107 can be ranked according to performance level to improve the examples 103 used to train the ANN model 101.

For example, during the improvement 117 of the examples, at least some of the existing examples 103 can be replaced with mutated samples 107 that have performance levels higher than the examples 103 being replaced.

After obtaining a superior set of examples 103 through evolution 115, the supervised machine learning 111 can be again applied to train the ANN model 101 and improve its performance level.

Figure 2:
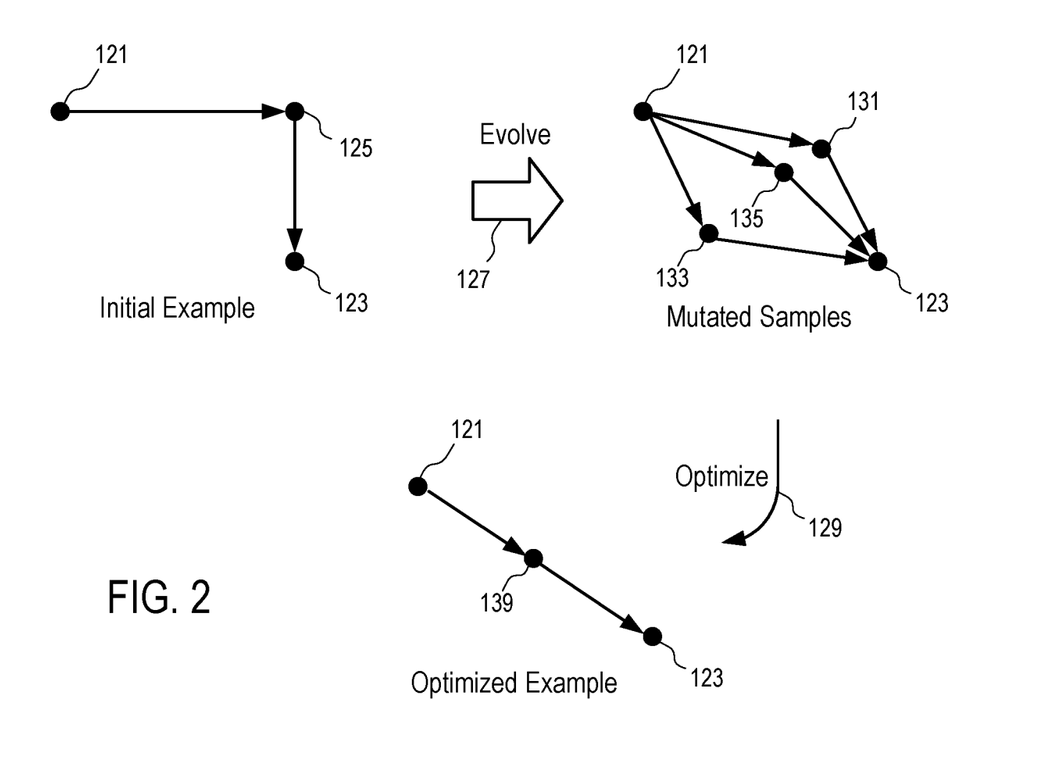
FIG. 2 shows an example illustrating evolutionary imitation learning according to one embodiment.

FIG. 2 shows an example illustrating evolutionary imitation learning according to one embodiment.

In FIG. 2, the robotic arm is initially instructed by a human operator to move from point 121 to point 123 via an intermediate point 125. The exercise controlled by the human operator generates an initial example 103 that can be used with supervised machine learning 111 to train ANN model 101 to perform the task of moving the robotic arm from point 121 to point 123.

After the ANN model 101 is trained using the initial example 103 to perform the task of moving the robotic arm from point 121 to point 123, the ANN model 101 can be used to exercise the robotic arm to perform the task.

Since the ANN model 101 is trained according to the initial example 103, the samples 105 are substantially similar to the move from point 121 to point 123 via the intermediate point 125.

The samples 105 can evolve 127 to mutated samples 107 through the modification of the position of the intermediate point 125. For example, the intermediate point 125 can be mutated from the position illustrated for the initial example to the points 131, 133, . . . , 135 illustrated for the mutated samples in FIG. 2.

The evolution 115 is performed in one or more directions that promotes performance improvements (e.g., reduced time, distance, energy consumption for the robotic arm to travel from point 121 to point 123).

The evolution 115 is used to optimize 129 the mutated samples 107 to identify an optimized example of moving from point 121 to point 123 via an intermediate point 139.

After the identification of the optimized example, the ANN model 101 can be further trained to perform the task of moving from point 121 to point 123 according to the optimized example. After the training, the robotic arm controlled by the ANN model 101 moves in a way similar to the optimized example via intermediate point 139, instead of via intermediate point 125.

An ANN model 101 trained based on non-optimized example (e.g., moving through intermediate point 125) may have a limit on allowable mutation that it can tolerate while still being successful in controlling the robotic arm to complete the task of moving from point 121 to point 123. Thus, it can take several iterations of evolution 115 to an improved mutation (e.g., moving through intermediate point 131, . . . , 135) for the improvement 117 of the examples 103 and fine-tune the ANN model 101 in iterations to allow the mutations to reach the optimal example.

The example of FIG. 2 is discussed above for the task of a robotic arm moving from point 121 to point 123. The example can be extended to moving a system from a state represented by point 121 to another state represented by point 123. Further, the search for an optimal example can be adapted to the task in a modified environment, such as the presence of an obstacle between point 121 and point 123.

Thus, the evolutionary imitation learning can be used by a computing system to learn optimized solutions for a known problem that has an initial solution (e.g., taught by a human operator), to adapt its solution skill to a changed environment, to discover solutions to variations of problems that are similar, to a degree, to a prior problem that have an initial solution.

Figure 3:
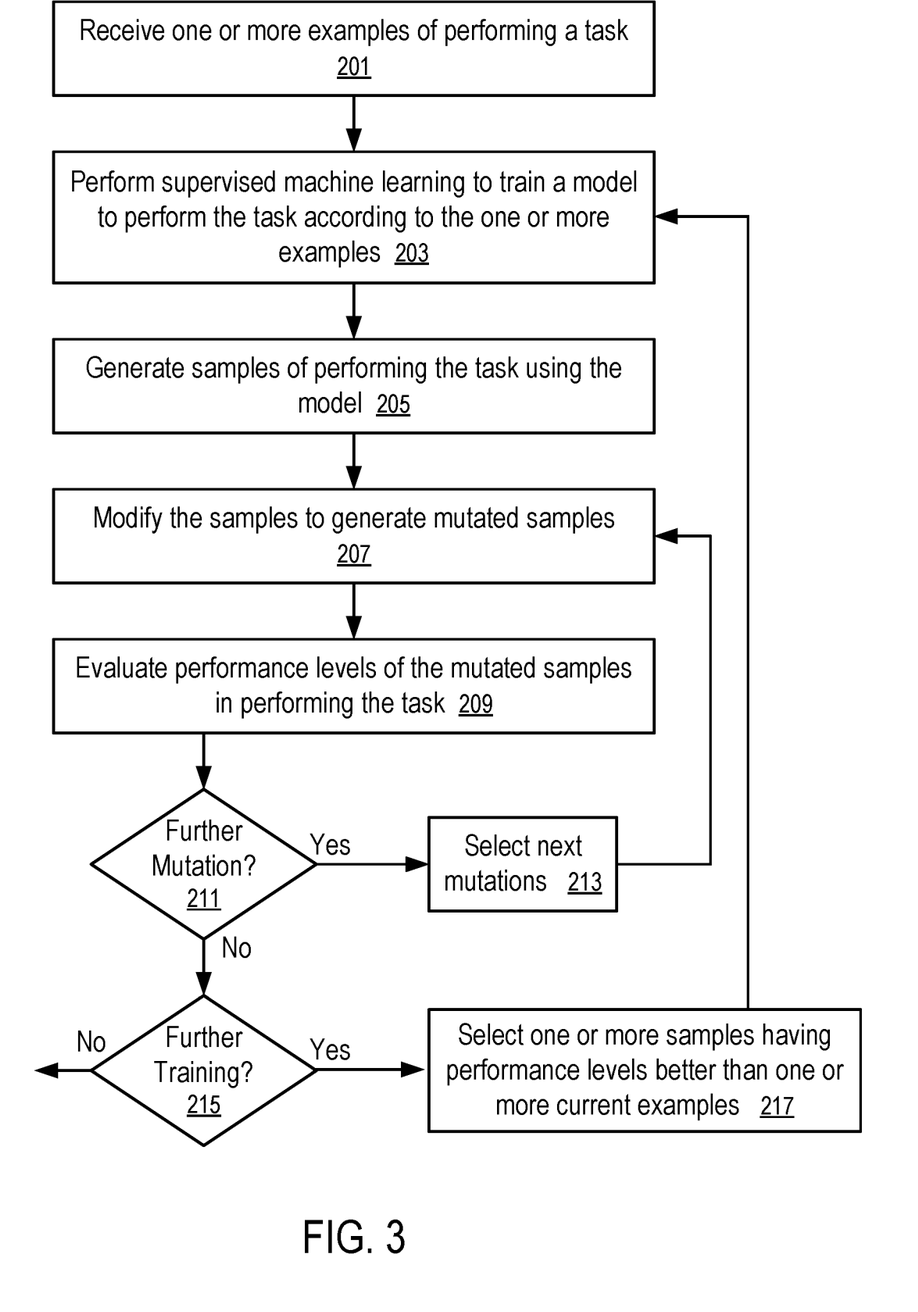
FIG. 3 shows a method of evolutionary imitation learning according to one embodiment.

FIG. 3 shows a method of evolutionary imitation learning according to one embodiment.

For example, the method of FIG. 3 can be performed in a computing system using the technique of FIG. 1. For example, the example of FIG. 2 can be implemented using the method of FIG. 3.

At block 201, the computing system receives one or more examples 103 of performing a task.

At block 203, the computing system performs supervised machine learning 111 to train a model 101 to perform the task according to the one or more examples 103.

At block 205, the computing system generates samples 105 of performing the task using the model 101.

At block 207, the computing system modifies the samples 105 to generate mutated samples 107 of performing the task.

At block 209, the computing system evaluates performance levels of the mutated samples 107 in performing the task.

At block 211, if the computing system determines to apply further mutations, the computing system selects next mutations at block 213.

For example, the performance levels of the previous mutations can be used to select the parameters and directions of further mutations that can lead to further improvement in performance level. For example, based on the distribution of the performance level changes caused by the previous mutations, the performance level changes of further mutations can be estimated or predicted. The estimated or predicted performance level changes can be used to select paths of mutations to promote evolution towards the direction of improved performance level.

At block 211, if the computing system determines not to apply further mutations, the computing system determines at block 215 whether to perform further training of the ANN model 101.

For example, when one or more mutated samples 107 are found to have better performances than the examples 103 previously used to train the ANN model 101 at block 203, the computing system can select, at block 217, one or more samples having performance levels better than one or more current examples. The selected high performance samples can be used to replace the low performance examples. The updated set of one or more examples 103 can be used at block 203 to further train the ANN model 101 using supervised machine learning 111.

The iterative operations of FIG. 3 can be used or performed to search for one or more optimal or near optimal examples. After the ANN model 101 is trained using the one or more optimal or near optimal examples, the ANN model can outperform initial examples 103 taught by one or more human operators.

Since the computing system can automatically reach the optimal or near optimal examples through evolutionary search, the efforts of human operators in teaching the ANN model 101 through imitation learning can be reduced.

Since evolutionary search is used, random trial-and-error associated with conventional reinforcement learning can be avoided.

Thus, the evolutionary imitation learning technique can overcome the limitation of conventional imitation learning where the performance level of the imitation learning trained ANN model is limited by the performance level of the examples used in the training. The evolutionary imitation learning technique can also overcome the inefficiency of random trial-and-error associated with conventional reinforcement learning.

Figure 4:
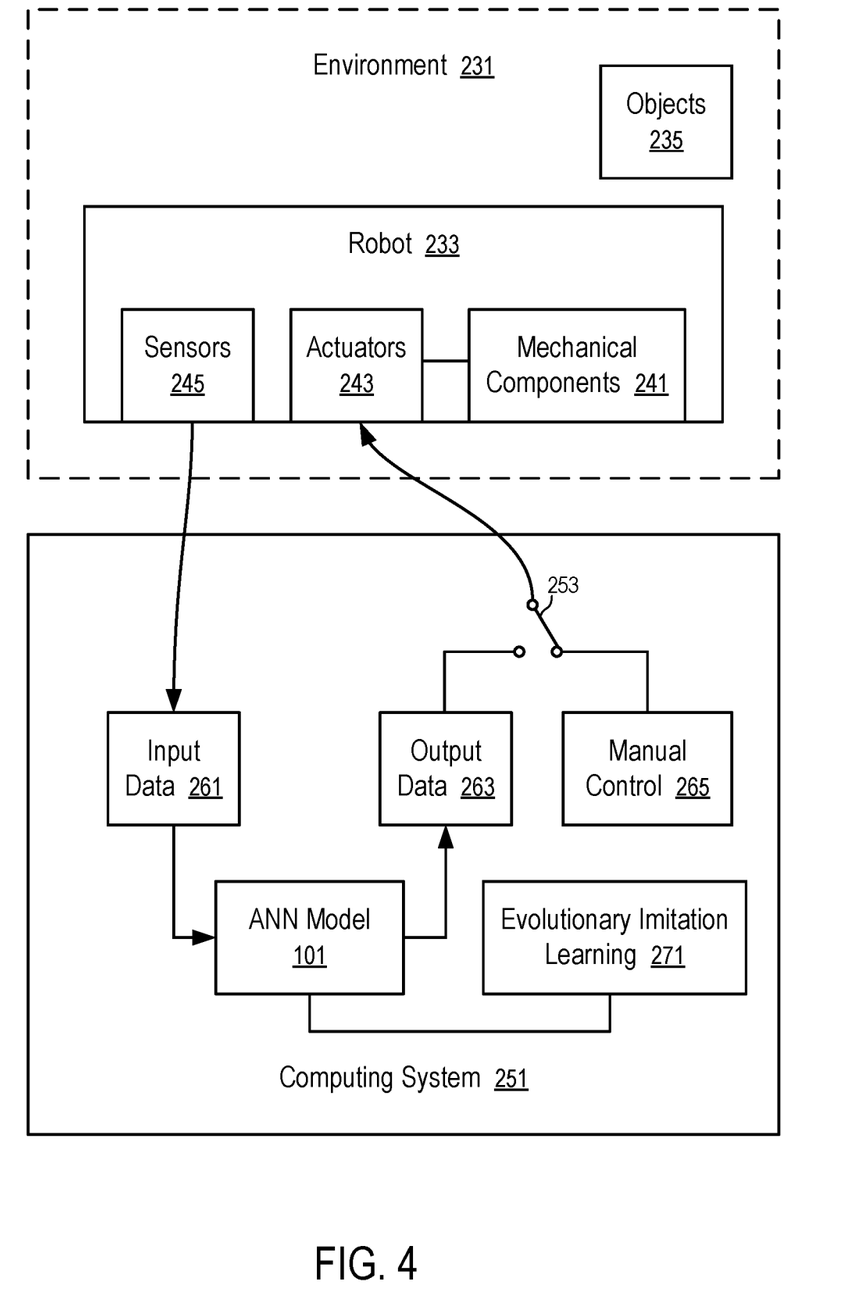
FIG. 4 shows a system having evolutionary imitation learning according to one embodiment.

FIG. 4 shows a system having evolutionary imitation learning according to one embodiment.

For example, the techniques of FIGS. 1 to 3 can be implemented in the system of FIG. 4.

In FIG. 4, a robot 233 is disposed in an operating environment 231 that can have a number of objects 235, such as items to be operated upon by the robot 233, tools, obstacle, etc.

The robot 233 has mechanical components 241, such as robotic arms and joints. The robot 233 has one or more sensors 245 to generate input data 261 representing the view of the environment 231 known to the robot 233, and one or more actuators 243 to control the operations of the mechanical components 241 to perform tasks in the environment 231.

The robot 233 is connected to a computing system 251. In some implementations, at least a portion of the computing system 251 is part of the robot 233.

The computing system 251 includes an ANN model 101, such as the ANN model 101 illustrated in FIG. 1. The ANN model 101 is configured to generate output data 263 to control the actuators 243 in performing a task based on input data 261 from the sensors 245.

A manual control 265 can also be used to generate similar data to control the actuators 243 of the robot 233 to perform a task, such as moving from point 121 to point 123 illustrated in FIG. 2. For example, the manual control 265 can be implemented using user interface elements, such as a graphical user interface, a joystick, a touch screen, a data glove, a handheld virtual reality controller, etc.

A switch 253 can be used to selectively connect the output data 263 of the ANN model 101 to control the actuators 243, or connect the manual control 265 to the actuators 243.

A human operator can use the manual control 265 to generate an example 103 of performing a task. The example 103 can include the input data 261 recorded during performance of the task and control data applied to the actuators via the manual control 265.

A set of instructions implementing evolutionary imitation learning 271, as illustrated in FIGS. 1 to 3, can be executed to train the ANN model 101.

As illustrated in FIG. 1, the evolutionary imitation learning 271 initially use the example 103 to train the ANN model 101 using supervised machine learning 111. In the training, the ANN model 101 is adjusted to reduce the difference between the output data 263 generated based on the input data 261 recorded for the example, and the corresponding data applied by the manual control 265 to the actuators 243. After the supervised machine learning 111, the ANN model 101 can control the robot 233 to perform the task in a way similar to the human operator controlling the robot 233 to perform the task.

After the learning through imitation, the evolutionary imitation learning 271 can use the ANN model 101 to try modified solutions of the output data 263. A technique of evolutionary algorithm is used by the evolutionary imitation learning 271 to search for mutations that improves the performance of the robot 233 in performing the same task, to search for solutions where the environment 231 is modified, and/or to search for solutions of a modified task.

The evolutionary imitation learning 271 tries different mutations as samples 105 or mutated samples 107 and evaluates the performance levels of the mutated samples 107. Based on tried mutations and the resulting performance changes, a subsequent set of modifications/mutations can be selected using the technique of evolutionary algorithm. Thus, a set of superior mutated samples 107 can be discovered under the control of evolutionary imitation learning 271 without efforts from a human operator. Mutated samples 107 having performance levels higher than the initial examples 103 can be used to further train the ANN model 101 through supervised machine learning 111. The operations of supervised machine learning 111 from examples 103 and discover improved examples from evolution 115 can be repeated to allow the ANN model to optimize the performance level of a predetermined task, to learn ways to perform a task having modification from the predetermined task, and/or to learn ways to perform a task when the environment 231 is modified. Thus, the overall quality and/or capability of the robot 233 can be continuously improved.

Figure 5:
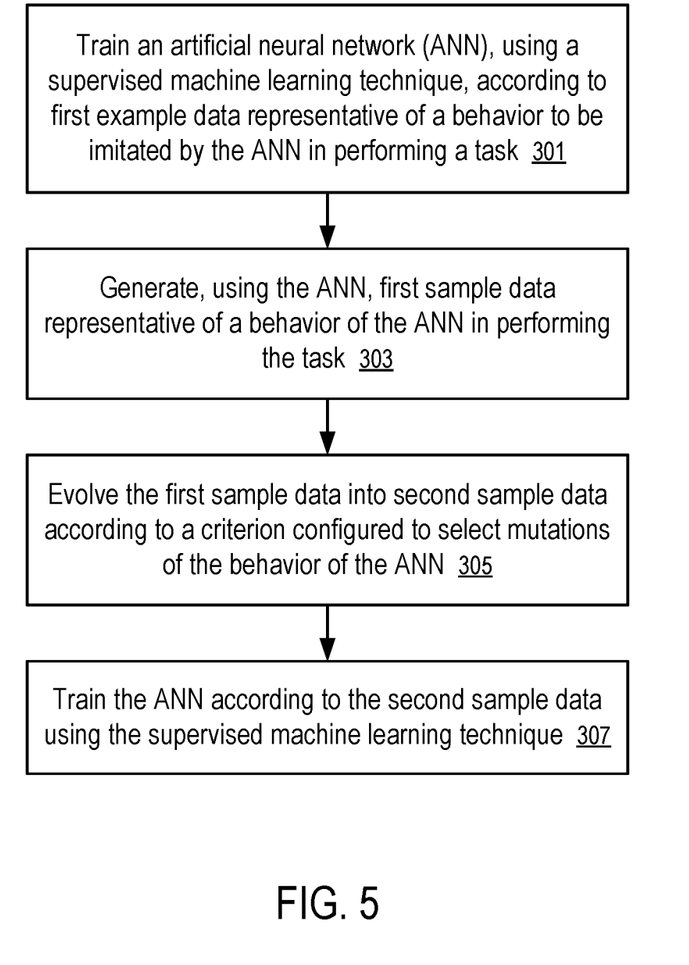
FIG. 5 shows a method of machine learning according to one embodiment.

FIG. 5 shows a method of machine learning according to one embodiment.

For example, the method of FIG. 5 can be implemented in a computing system 251 of FIG. 4.

At block 301, the computing system 251 trains an artificial neural network (e.g., ANN model 101), using a supervised machine learning technique, according to first example data representative of a behavior to be imitated by the ANN in performing a task.

For example, in response to input data 261 from sensors of a robot 233, the ANN model 101 can be used to generate output data 263 to control actuators 243 of the robot 233 to perform the task. To train the ANN model 101 to have a behavior similar to a human operator in controlling the robot 233 to perform the task, the first example data can include an example 103 having the corresponding input data 261 generated by the sensors 245 while the actuators 243 are controlled by the human operator through corresponding output data generated using a manual control 265. The supervised machine learning 111 trains the ANN model 101 to mimic the behavior of the human operator in performing the task, such as moving from point 121 to point 123 via an intermediate point 125, or moving from one state to another via an intermediate state. The supervised machine learning 111 reduces differences between the corresponding output data in the example 103 generated using the manual control 265 and the output data 263 generated by the ANN model 101 responsive to the input data 261 in the example 103.

At block 303, the computing system 251 generates, using the ANN, first sample data representative of a behavior of the ANN in performing the task.

For example, the ANN model 101 trained according to the examples 103 can be used to control the robot 233 to perform the task as a sample 105. The observation 113 of the sample 105 of the robot 233 performing the task can include the input data 261 generated by the sensors 245 in the sample 105 and the output data 263 generated by the ANN model 101 in the sample 105.

At block 305, the computing system 251 evolves the first sample data into second sample data according to a criterion configured to select mutations of the behavior of the ANN.

For example, the computing system 251 modifies the first sample data through iterations of evolution 115 using a technique of evolutionary algorithm to generate the second sample data. The evolution criterion is configured to compare overall performance of mutations and select directions of mutations to promote overall performance.

For example, after first changes are applied to aspects of the first sample data to generate third sample data, the computing system 251 can use the evolution criterion to select from the aspects for applying second changes to generate the second sample data. The selection can be based on performance levels of the third sample data evaluated according to the criterion. For example, aspects having incremental changes that lead to performance improvement in a prior evolution iteration can be selected to apply further incremental changes to search for better mutations.

For example, the second sample data can be selected by comparing a performance of the example 103 used in the prior iteration of supervised machine learning 111 and a performance level of a mutated sample 107 discovered via evolution 115. If the mutated sample 107 has a better performance level, the mutated sample 107 can be used to replace the prior example 103 for the next iteration of supervised machine learning 111.

At block 307, the computing system 251 trains the ANN according to the second sample data using the supervised machine learning technique.

Thus, after a first iteration of supervised machine learning 111 is performed using examples 103 created by a human operator, the computing system 251 can continue improve the ANN model 101 through observation 113 and evolution 115 to discover new examples to improve the ANN model 101 without further effort from human operators.

For example, the first example data is collected during performing the task at a first performance level; and the second sample data is generated through evolution 115 in performing the task at a second performance level higher than the first performance level. Thus, after the supervised machine learning 111 according to the second sample data, the performance level of the robot 233 is improved.

For example, when the environment 231 in which the robot 233 operates to perform the task is changed from a first environment to a second environment, the evolution 115 allows the computing system 251 to adapt the ANN model 101 to perform the task in the second environment. different from the first environment.

The evolution 115 can be used to discover solutions to new tasks. For example, the example 103 is initially provided for the performance of a first task. The second sample data is generated through evolution 115 in performing a second task having a modification from the first task. Thus, the computing system 251 can improve the ANN model 101 by discovering solutions to new tasks as incremental mutations from the initial task that can be performed by the ANN model 101.

Figure 6:
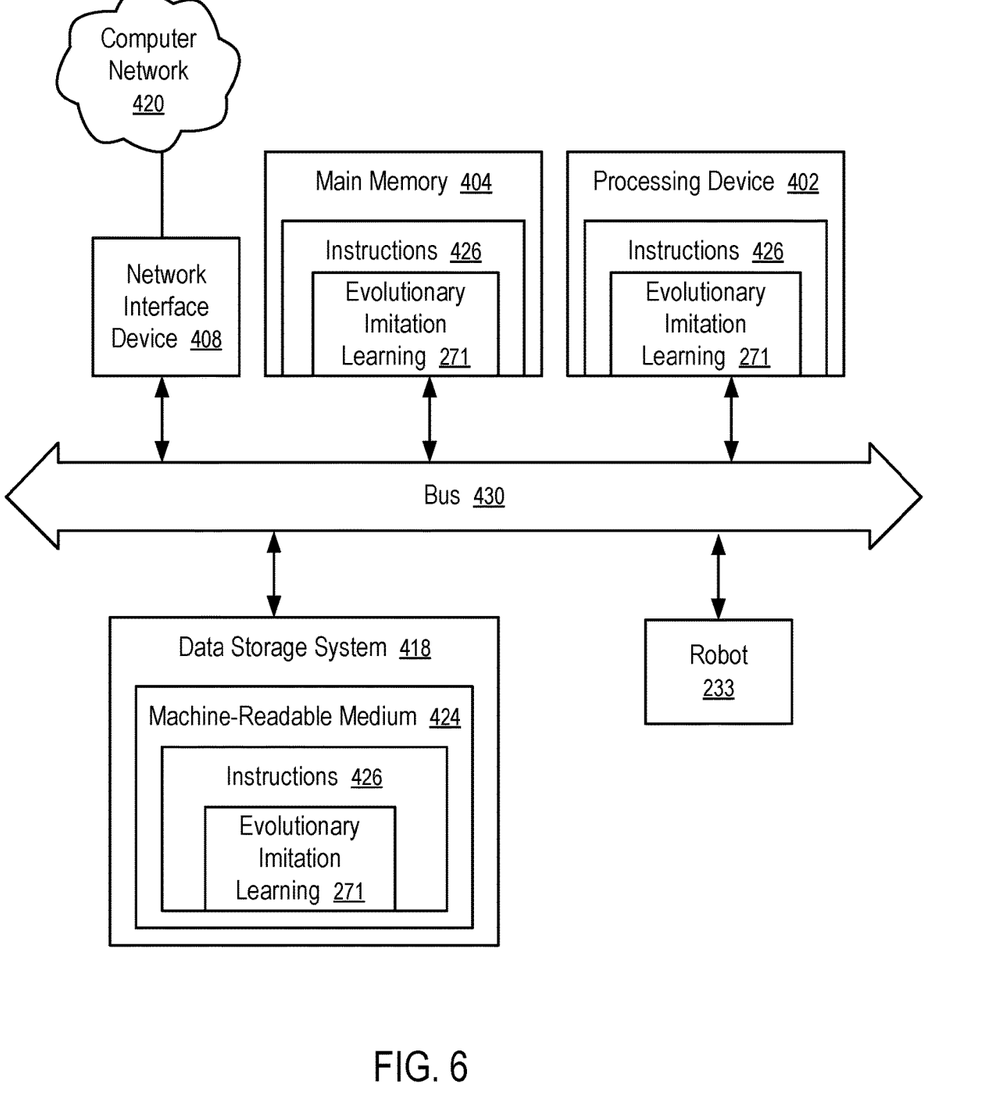
FIG. 6 shows a block diagram of an example computer system in which embodiments of the present disclosure can operate.

The computing system 251 can be implemented using a machine illustrated in FIG. 6.

FIG. 6 illustrates an example machine of a computer system within which a set of instructions, for causing the machine to perform any one or more of the methodologies discussed herein, can be executed.

In some embodiments, the computer system of FIG. 6 can implement a system of FIG. 4 with evolutionary imitation learning techniques of FIG. 1 and/or FIG. 3.

The computer system of FIG. 6 can be used to perform the operations of evolutionary imitation learning 271 described with reference to FIGS. 1-4 by executing instructions configured to perform the operations corresponding to the evolutionary imitation learning 271.

In some embodiments, the machine as illustrated in FIG. 6 can be connected (e.g., networked) to other machines in a Local Area Network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

For example, the machine can be configured as a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system illustrated in FIG. 6 includes a processing device 402, a main memory 404, and a data storage system 418, which communicate with each other via a bus 430. For example, the processing device 402 can include one or more microprocessors; the main memory can include read-only memory (ROM), flash memory, dynamic random access memory (DRAM), such as synchronous DRAM (SDRAM) or Rambus DRAM (RDRAM), static random access memory (SRAM), etc. The bus 430 can include, or be replaced with, multiple buses.

The processing device 402 in FIG. 6 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), a network processor, or the like. The processing device 402 is configured to execute instructions 426 for performing the operations discussed in connection with the evolutionary imitation learning 271.

The computer system of FIG. 6 can further include a network interface device 408 to communicate over a computer network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system, the main memory 404 and the processing device 402 also constituting machine-readable storage media.

In one embodiment, the instructions 426 include instructions to implement functionality corresponding to evolutionary imitation learning 271, such as evolutionary imitation learning 271 described with reference to FIGS. 1-4 in improving the ANN model 101 of a robot 233. While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
    training an artificial neural network (ANN), using a
        supervised machine learning technique, according to first example data representative of a behavior to be imitated by the ANN in performing a task;
generating, using the ANN, first sample data representative of a behavior of the ANN in performing the task;
generating second sample data from the first sample data according to a criterion configured to select mutations of the behavior of the ANN; and
training the ANN according to the second sample data using the supervised machine learning technique.

2. The method of claim 1, wherein the generating of the second sample data comprises:
applying first changes to aspects of the first sample data to generate third sample data; and
selecting from the aspects for applying second changes to generate the second sample data based on performance levels of the third sample data evaluated according to the criterion.

3. The method of claim 2, wherein the generating of the second sample data further comprises:
selecting the second sample data based on comparing a performance level of the first example data and a performance level of sampled data mutated from the first sample data.

4. The method of claim 3, further comprising:
evaluating a performance level of a robot in each instance of performing in the first example data, in the first sample data, and in the second sample data.

5. The method of claim 4, wherein the ANN is configured to receive input data representative of sensor data received during the robot performing a respective task and to generate output data representative of control signals applied to the robot during performing the respective task.

6. The method of claim 5, wherein the first example data includes first input data to the ANN and first output data used to control the robot; the training according to the first example data reduces differences between the first output data and outputs generated by the ANN responsive to the first input data.

7. The method of claim 6, wherein the second sample data includes second input data to the ANN and second output data; and the training according to the second sample data uses the second sample data as second example data to reduce differences between the second output data and outputs generated by the ANN responsive to the second input data.

8. The method of claim 7, wherein the first example data includes data representative of an example of control signals selected by a human operator to operate the robot to perform the task.

9. The method of claim 8, wherein the second sample data is generated from the first sample data without a human operator controlling the robot.

10. The method of claim 9, wherein the generating of the second sample data is performed using a technique of evolutionary algorithm.

11. The method of claim 10, wherein the first example data is collected during performing the task in a first environment; and the second sample data is generated in performing the task by the robot in a second environment different from the first environment.

12. The method of claim 10, wherein the first example data is collected during performing the task at a first performance level; and the second sample data is generated in performing the task at a second performance level higher than the first performance level.

13. The method of claim 10, wherein the task is a first task; and the second sample data is generated in performing a second task having a modification from the first task.

14. A system, comprising:
memory storing instructions; and
at least one processor configured via the instructions to:
train an artificial neural network (ANN), using a supervised machine learning technique, according to first example data representative of a behavior to be imitated by the ANN in performing a task;
generate, using the ANN, first sample data representative of a behavior of the ANN in performing the task;
modify the first sample data to generate second sample data according to a criterion configured to select mutations of the behavior of the ANN; and
train the ANN according to the second sample data using the supervised machine learning technique.

15. The system of claim 14, further comprising:
a robot having actuators and sensors to generate input data for the ANN, the ANN trained using the supervised machine learning technique to generate output data to control the actuators;
wherein the at least one processor is further configured to generate the second sample data from the first sample data using a technique of evolutionary algorithm.

16. The system of claim 15, wherein the first example data includes first input data to the ANN and first output data used to control the actuator in performing the task; the ANN is trained according to the first example data to reduce differences between the first output data and outputs generated by the ANN responsive to the first input data; the second sample data includes second input data to the ANN and second output data; and the ANN is trained according to the second sample data to reduce differences between the second output data and outputs generated by the ANN responsive to the second input data.

17. A non-transitory computer readable medium storing instructions which, when executed by a computing system, cause the computing system to perform a method, the method comprising:
training an artificial neural network (ANN), using a supervised machine learning technique, according to first example data representative of a behavior to be imitated by the ANN in performing a task;
generating, using the ANN, first sample data representative of a behavior of the ANN in performing the task;
modifying first sample data using a technique of evolutionary algorithm to generate second sample data according to a criterion configured to select mutations of the behavior of the ANN; and
training the ANN according to the second sample data using the supervised machine learning technique.

18. The non-transitory computer readable medium of claim 17, wherein the first example data is collected during performing the task in a first environment; and the second sample data is generated in performing the task in a second environment different from the first environment.

19. The non-transitory computer readable medium of claim 17, wherein the first example data is collected during performing the task at a first performance level; and the second sample data is generated in performing the task at a second performance level higher than the first performance level.

20. The non-transitory computer readable medium of claim 17, wherein the task is a first task; and the second sample data is generated in performing a second task having a modification from the first task.

* * * * *